E. KENWORTHY.
GRASSHOPPER CATCHER.
No. 184,970. Patented Dec. 5, 1876.
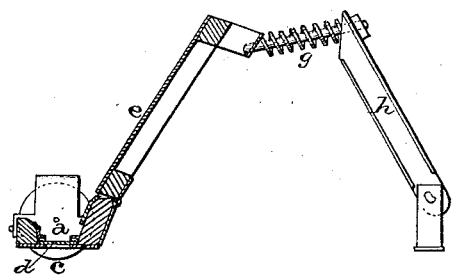
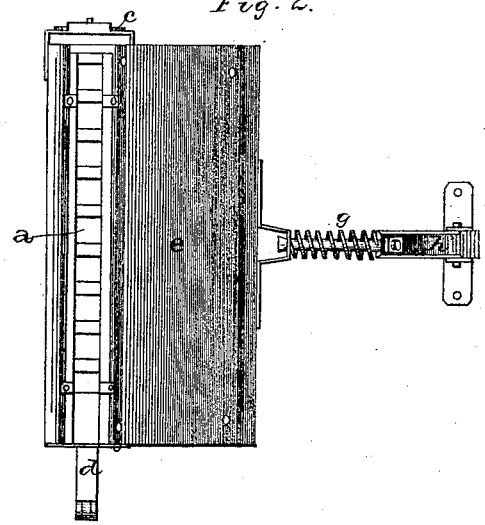

UNITED STATES PATENT OFFICE.

ELISHA KENWORTHY, OF WALNUT, IOWA.

IMPROVEMENT IN GRASSHOPPER-CATCHERS.

Specification forming part of Letters Patent No. 184,970, dated December 5, 1876; application filed October 17, 1876.

*To all whom it may concern:*

Be it known that I, E. KENWORTHY, of Walnut, in the county of Pottawattamie and State of Iowa, have invented certain new and useful Improvements in Grasshopper-Catchers; and I do hereby declare the following to be a full, clear, and exact description of the invention, such as will enable others skilled in the art to which it pertains to make and use it, reference being had to the accompanying drawings, which form part of this specification.

My invention relates to an improvement in grasshopper-exterminators; and it consists in the arrangement and combination of parts, that will be more fully described hereinafter, whereby the device can be placed upon a reaping-machine and operated by the pitman.

Figure 1 is a vertical section of my invention, and Fig. 2 is a plan view of the same.

The accompanying drawings represent my invention.

$a$ represents a suitable trough, made of any desired length, width, or material, and which has a number of slots made across its bottom. This trough is designed to be placed across the front of the reaper platform, so as to be in line with the pitman, and which has a supporting-wheel, $c$, on its outer end, to enable it to run smoothly over the ground. Working back and forth in this trough, operated by the pitman, is the sickle-bar $d$, which likewise has a number of slots or holes through it, but wider than the slots in the bottom of the trough. This sickle may be made of one single piece or two horizontal pieces, and have cross-bars secured to them, the cross-pieces being beveled on their under sides, and the sides of the slots in the bottom being similarly beveled on their under edges. The rear side of the trough is higher than the front, is inclined backward, covered with sheet metal, and has hinged to it the inclined platform $e$, which is also covered with sheet metal, so as to cause the grasshoppers to slide down into the trough. This platform is held in position by the spring-rod $g$, which has its rear end fastened to the top of the brace $h$, which brace is fastened to the platform or some other support. The spring is used to impart a vibratory motion to the platform as the machine is drawn along, so as to shake the hoppers down as fast as they light upon its front. As rapidly as the hoppers fall into the trough they are crushed to death by the rapid reciprocations of the sickle, and then forced out of the bottom of the trough through the openings.

In using my device the cutter-bar or blade is disconnected from its pitman, so that it will no longer operate when the machine is in motion, and then my device, as above described, is placed upon the front edge of the platform, secured in position, and its sickle-bar connected to the pitman. When the mowing or reaping machine is drawn over the ground the motion of the machine causes the bar $d$ to reciprocate back and forth and kill the insects as fast as they fall into the trough.

Having thus described my invention, I claim—

1. The combination of a trough, a sickle operating therein, and the pitman of a reaping-machine, substantially as specified.

2. The inclined platform $e$, in combination with a spring-support, and the trough $a$, substantially as set forth.

In testimony that I claim the foregoing I have hereunto set my hand this 25th day of September, 1876.

ELISHA KENWORTHY.

Witnesses:
J. B. S. CASE,
HENRY HAGGE.